(12) United States Patent
Singh et al.

(10) Patent No.: US 8,912,781 B2
(45) Date of Patent: Dec. 16, 2014

(54) INTEGRATED CIRCUIT SWITCHING POWER SUPPLY CONTROLLER WITH SELECTABLE BUCK MODE OPERATION

(75) Inventors: Rahul Singh, Austin, TX (US); John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 1031 days.

(21) Appl. No.: 12/973,003

(22) Filed: Dec. 20, 2010

(65) Prior Publication Data

US 2012/0025736 A1 Feb. 2, 2012

Related U.S. Application Data

(60) Provisional application No. 61/369,202, filed on Jul. 30, 2010.

(51) Int. Cl.
*H02M 3/156* (2006.01)
*H02M 3/335* (2006.01)
*H05B 33/08* (2006.01)

(52) U.S. Cl.
CPC .......... *H02M 3/33507* (2013.01); *H02M 3/156* (2013.01); *H05B 33/0851* (2013.01); *Y02B 20/347* (2013.01); *H05B 33/0815* (2013.01)
USPC .......................... 323/285; 323/351; 363/21.12

(58) Field of Classification Search
USPC .......................... 323/282, 285–287, 351, 371; 363/21.12, 21.16, 147, 178
See application file for complete search history.

(56) References Cited

U.S. PATENT DOCUMENTS

| | | |
|---|---|---|
| 3,790,878 A | 2/1974 | Brokaw |
| 4,677,366 A | 6/1987 | Wilkinson et al. |
| 4,683,529 A | 7/1987 | Bucher |
| 4,737,658 A | 4/1988 | Kronmuller et al. |
| 4,937,728 A | 6/1990 | Leonardi |
| 4,940,929 A | 7/1990 | Williams |
| 4,977,366 A | 12/1990 | Powell |
| 5,001,620 A | 3/1991 | Smith |

(Continued)

FOREIGN PATENT DOCUMENTS

| | | |
|---|---|---|
| EP | 0636889 | 1/1995 |
| EP | 0636889 A1 | 1/1995 |

(Continued)

OTHER PUBLICATIONS

Fairchild Semiconductor, 500W Power-Factor-Corrected (PFC) Converter Design with FAN4810, Application Note 6004, Rev. 1.0.1, Oct. 31, 2003, 10 pages (pp. 1-10 in pdf), San Jose, CA, USA.

(Continued)

*Primary Examiner* — Fred E Finch, III (74) *Attorney, Agent, or Firm* — Mitch Harris, Atty at Law, LLC; Andrew M. Harris (57) ABSTRACT

An integrated circuit (IC) controller for a switching power supply has a selectable operating mode for supporting multiple switching power supply topologies. The IC controls current by controlling a cycle rate of the switching power supply to provide a constant or variable output current, which may be provided to lighting devices such as light-emitting diodes (LEDs). The selectable operating mode includes at least a buck converter operating mode and another operating mode, which may be a flyback converter operating mode.

19 Claims, 5 Drawing Sheets

(56) References Cited

U.S. PATENT DOCUMENTS

| | | |
|---|---|---|
| 5,055,746 A | 10/1991 | Hu et al. |
| 5,109,185 A | 4/1992 | Ball |
| 5,278,490 A | 1/1994 | Smedley |
| 5,383,109 A | 1/1995 | Maksimovic et al. |
| 5,424,932 A | 6/1995 | Inou et al. |
| 5,481,178 A | 1/1996 | Wilcox et al. |
| 5,565,761 A | 10/1996 | Hwang |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,783,909 A | 7/1998 | Hochstein |
| 5,798,635 A | 8/1998 | Hwang et al. |
| 5,960,207 A | 9/1999 | Brown |
| 5,994,885 A | 11/1999 | Wilcox et al. |
| 6,043,633 A | 3/2000 | Lev et al. |
| 6,084,450 A | 7/2000 | Smith et al. |
| 6,091,233 A | 7/2000 | Hwang et al. |
| 6,229,292 B1 | 5/2001 | Redl et al. |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus |
| 6,343,026 B1 | 1/2002 | Perry |
| 6,445,600 B2 | 9/2002 | Ben-Yaakov |
| 6,469,484 B2 | 10/2002 | L'Hermite et al. |
| 6,531,854 B2 | 3/2003 | Hwang |
| 6,580,258 B2 | 6/2003 | Wilcox et al. |
| 6,583,550 B2 | 6/2003 | Iwasa |
| 6,628,106 B1 | 9/2003 | Batarseh et al. |
| 6,657,417 B1 | 12/2003 | Hwang |
| 6,724,174 B1 | 4/2004 | Esteves et al. |
| 6,768,655 B1 | 7/2004 | Yang et al. |
| 6,781,351 B2 | 8/2004 | Mednik et al. |
| 6,839,247 B1 | 1/2005 | Yang |
| 6,882,552 B2 | 4/2005 | Telefus et al. |
| 6,933,706 B2 | 8/2005 | Shih |
| 6,940,733 B2 | 9/2005 | Schie et al. |
| 6,944,034 B1 | 9/2005 | Shteynberg et al. |
| 6,956,750 B1 | 10/2005 | Eason et al. |
| 6,975,523 B2 | 12/2005 | Kim et al. |
| 7,072,191 B2 | 7/2006 | Nakao et al. |
| 7,099,163 B1 | 8/2006 | Ying |
| 7,102,902 B1 | 9/2006 | Brown et al. |
| 7,145,295 B1 | 12/2006 | Lee et al. |
| 7,161,816 B2 | 1/2007 | Shteynberg et al. |
| 7,221,130 B2 | 5/2007 | Ribeiro et al. |
| 7,266,001 B1 | 9/2007 | Notohamiprodjo et al. |
| 7,276,861 B1 | 10/2007 | Shteynberg et al. |
| 7,292,013 B1 | 11/2007 | Chen et al. |
| 7,310,244 B2 | 12/2007 | Yang et al. |
| 7,388,764 B2 | 6/2008 | Huynh |
| 7,554,473 B2 | 6/2009 | Melanson |
| 7,642,762 B2 | 1/2010 | Xie et al. |
| 7,667,986 B2 | 2/2010 | Artusi et al. |
| 7,710,047 B2 | 5/2010 | Shteynberg et al. |
| 7,719,246 B2 | 5/2010 | Melanson |
| 7,719,248 B1 * | 5/2010 | Melanson .................. 323/283 |
| 7,746,043 B2 | 6/2010 | Melanson |
| 7,804,256 B2 | 9/2010 | Melanson |
| 7,804,480 B2 | 9/2010 | Jeon et al. |
| 7,852,017 B1 | 12/2010 | Melanson |
| 7,872,883 B1 | 1/2011 | Elbanhawy |
| 7,894,216 B2 | 2/2011 | Melanson |
| 2003/0090252 A1 | 5/2003 | Hazucha |
| 2003/0174520 A1 | 9/2003 | Bimbaud |
| 2003/0214821 A1 | 11/2003 | Giannopoulos et al. |
| 2003/0223255 A1 | 12/2003 | Ben-Yaakov |
| 2004/0046683 A1 | 3/2004 | Mitamura et al. |
| 2004/0196672 A1 * | 10/2004 | Amei ............................ 363/20 |
| 2005/0057237 A1 | 3/2005 | Clavel |
| 2005/0207190 A1 | 9/2005 | Gritter |
| 2005/0231183 A1 * | 10/2005 | Li et al. ...................... 323/299 |
| 2005/0270813 A1 | 12/2005 | Zhang et al. |
| 2005/0275354 A1 | 12/2005 | Hausman |
| 2006/0013026 A1 | 1/2006 | Frank et al. |
| 2006/0022916 A1 | 2/2006 | Aiello |
| 2006/0214603 A1 | 9/2006 | Oh |
| 2006/0261754 A1 | 11/2006 | Lee |
| 2006/0285365 A1 | 12/2006 | Huynh |
| 2007/0024213 A1 | 2/2007 | Shteynberg |
| 2007/0103949 A1 | 5/2007 | Tsuruya |
| 2007/0170873 A1 | 7/2007 | Mishima |
| 2007/0182338 A1 | 8/2007 | Shteynberg |
| 2007/0285031 A1 | 12/2007 | Shteynberg |
| 2008/0018261 A1 | 1/2008 | Kastner |
| 2008/0043504 A1 | 2/2008 | Ye |
| 2008/0062586 A1 * | 3/2008 | Apfel ............................ 361/18 |
| 2008/0117656 A1 | 5/2008 | Clarkin |
| 2008/0130336 A1 | 6/2008 | Taguchi |
| 2008/0174291 A1 | 7/2008 | Hansson |
| 2008/0175029 A1 | 7/2008 | Jung et al. |
| 2008/0224636 A1 | 9/2008 | Melanson |
| 2008/0259655 A1 | 10/2008 | Wei et al. |
| 2008/0278132 A1 | 11/2008 | Kesterson et al. |
| 2008/0310194 A1 | 12/2008 | Huang et al. |
| 2009/0059632 A1 * | 3/2009 | Li et al. ......................... 363/124 |
| 2009/0067204 A1 | 3/2009 | Ye et al. |
| 2009/0108677 A1 | 4/2009 | Walter et al. |
| 2009/0184665 A1 * | 7/2009 | Ferro ............................ 315/297 |
| 2009/0284182 A1 | 11/2009 | Cencur |
| 2010/0128501 A1 * | 5/2010 | Huang et al. ............... 363/21.16 |
| 2010/0141317 A1 | 6/2010 | Szajnowski |
| 2010/0213859 A1 | 8/2010 | Shteynberg |
| 2011/0276938 A1 * | 11/2011 | Perry et al. .................... 716/133 |

FOREIGN PATENT DOCUMENTS

| | | |
|---|---|---|
| EP | 1213823 A2 | 6/2002 |
| EP | 1289107 A2 | 3/2003 |
| EP | 2232949 | 9/2010 |
| WO | 2006013557 | 2/2006 |
| WO | 2006/022107 | 3/2006 |
| WO | WO 2007/016373 A3 | 2/2007 |
| WO | 2008152838 | 12/2008 |
| WO | 2010065598 | 10/2010 |

OTHER PUBLICATIONS

Fairfield Semiconductor, Power Factor Correction (PFC) Basics, Application Note 42047, Rev. 0.9.0, Aug. 19, 2004, 11 pages (pp. 1-11 in pdf), San Jose, CA, USA.

Fairchild Semiconductor, Design of Power Factor Correction Circuit Using FAN7527B, Application Note AN4121, Rev. 1.0.1, May 30, 2002, 22 pages (pp. 1-22 in pdf), San Jose, CA, USA.

Fairchild Semiconductor, Low Start-Up Current PFC/PWM Controller Combos FAN4800, Rev. 1.0.6, Nov. 2006, 20 pages (pp. 1-20 in pdf), San Jose, CA, USA.

Fairchild Semiconductor, Power Factor Correction Controller FAN4810, Rev. 1.0.12, Sep. 24, 2003, 14 pages (pp. 1-14 in pdf), San Jose, CA, USA.

Fairchild Semiconductor, ZVS Average Current PFC Controller FAN 4822, Rev. 1.0.1, Aug. 10, 2001, 10 pages (pp. 1-10 in pdf), San Jose, CA, USA.

Fairchild Semiconductor, Ballast Control IC FAN7532, Rev. 1.0.2, Jun. 2006, 16 pages (pp. 1-16 in pdf), San Jose, CA, USA.

Fairchild Semiconductor, Simple Ballast Controller FAN7544, Rev. 1.0.0, Sep. 21, 2004, 14 pages (pp. 1-14 in pdf), San Jose, CA, USA.

Fairchild Semiconductor, Power Factor Correction Controller FAN7527B, Aug. 16, 2003, 12 pages (pp. 1-12 in pdf), San Jose, CA, USA.

Fairchild Semiconductor, Ballast Control IC FAN7711, Rev. 1.0.2, Mar. 2007, 23 pages (pp. 1-23 in pdf), San Jose, CA, USA.

Fairchild Semicondctor, Simple Ballast Controller, KA7541, Rev. 1.0.3, Sep. 27, 2001, 14 pages (pp. 1-14 in pdf), San Jose, CA, USA.

Fairchild Semiconductor, Power Factor Controller, ML4812, Rev. 1.0.4, May 31, 2001, 18 pages (pp. 1-18 in pdf), San Jose, CA, USA.

Fairchild Semiconductor, Power Factor Controller, ML4821, Rev. 1.0.2, Jun. 19, 2001, 11 pages (pp. 1-11 in pdf), San Jose, CA, USA.

(56) References Cited

OTHER PUBLICATIONS

Freescale Semiconductor, Dimmable Light Ballast with Power Factor Correction, Designer Reference Manual, DRM067, Rev. 1, Dec. 2005, 72 pags (pp. 1-72 in pdf), M68HC08 Microcontrollers, Chandler, AZ, USA.
Freescale Semiconductor, Design of Indirect Power Factor Correction Using 56F800/E, Freescale Semiconductor Application Note, AN1965, Rev. 1, Jul. 2005, 20 pages (pp. 1-20 in pdf), Chandler, AZ, USA.
Freescale Semiconductor, Implementing PFC Average Current Mode Control using the MC9S12E128, Application Note AN3052, Addendum to Reference Design Manual DRM064, Rev. 0, Nov. 2005, 8 pages (pp. 1-8 in pdf), Chandler, AZ, USA.
Maksimovic, et al, Impact of Digital Control in Power Electronics, International Symposium on Power Semiconductor Devices and ICS, May 2004, pp. 13-22, Boulder, CO, USA.
Mammano, Bob, Current Sensing Solutions for Power Supply Designers, Texas Instruments, 2001, 36 pages (pp. 1-36 in pdf), Dallas TX.
Noon, Jim, High Performance Power Factor Preregulator UC3855A/B, Texas Instruments Application Report, SLUA146A, May 1996—Revised Apr. 2004, 35 pages (pp. 1-35 in pdf), Dallas TX, USA.
NXP Semiconductors, TEA1750, GreenChip III SMPS Control IC Product Data Sheet, Rev.01, Apr. 6, 2007, 30 pages (pp. 1-30 in pdf), Eindhoven, The Netherlands.
Turchi, Joel, Power Factor Correction Stages Operating in Critical Conduction Mode, on Semiconductor, Application Note AND8123/D, Sep. 2003-Rev. 1, 20 pages (pp. 1-20 in pdf), Denver, CO, USA.
On Semiconductor, GreenLLine Compact Power Factor Controller: Innovative Circuit for Cost Effective Solutions, MC33260, Semiconductor Components Industries, Sep. 2005—Rev. 9, 22 pages (pp. 1-22 in pdf), Denver, CO, USA.
On Semiconductor, Enhanced, High Voltage and Efficient Standby Mode, Power Factor Controller, NCP1605, Feb. 2007, Rev. 1, 32 pages (pp. 1-32 in pdf), Denver, CO, USA.
On Semiconductor, Cost Effective Power Factor Controller, NCP1606, Mar. 2007, Rev. 3, 22 pages (pp. 1-22 in pdf), Denver, CO, USA.
On Semiconductor, Power Factor Controller for Compact and Robust, Continuous Conduction Mode Pre-Converters, NCP1654, Mar. 2007, 10 pages (pp. 1-10 in pdf), Rev. P0, Denver, CO, USA.
Philips Semiconductors, 90W Resonant SMPS with TEA1610 SwingChip, Application Note AN99011, Sep. 14, 1999, 28 pages (pp. 1-28 in pdf), The Netherlands.
Renesas, Renesas Technology Releases Industry's First Critical-Conduction-Mode Power Factor Correction Control IC Implementing Interleaved Operations, R2A20112, Dec. 18, 2006, 4 pages (pp. 1-4 in pdf), Tokyo, Japan.
Renesas, PFC Control IC R2A20111 Evaluation Board, Application Note R2A20111 EVB, Feb. 2007, 40 pages (pp. 1-40 in pdf), Rev. 1.0, Tokyo, Japan.
Renesas, Power Factor Correction Controller IC, HA16174P/FP, Rev. 1.0, Jan. 6, 2006, 38 pages (pp. 1-38 in pdf), Tokyo, Japan.
Stmicroelectronics, Transition-Mode PFC Controller, Datasheet L6562, Rev. 8, Nov. 2005, pp. 1-16, Geneva, Switzerland.
Stmicroelectronics, Electronic Ballast with PFC Using L6574 and L6561, Application Note AN993, May 2004, pp. 1-20, Geneva Switzerland.
Stmicroelectronics, Advanced Transition-Mode PFC Controller L6563 and L6563A, Mar. 2007, 40 pages (pp. 1-40 in pdf), Geneva Switzerland.
Stmicroelectronics, CFL/TL Ballast Driver Preheat and Dimming, L6574, Sep. 2003, pp. 1-10, Geneva Switzerland.
Stmicroelectronics, Power Factor Corrector, L6561, Rev. 16, Jun. 2004, pp. 1-13, Geneva, Switzerland.
Texas Instruments, Avoiding Audible Noise at Light Loads When Using Leading Edge Triggered PFC Converters, Application Report SLUA309A, Mar. 2004—Revised Sep. 2004, 4 pages (pp. 1-4 in pdf), Dallas, TX, USA.
Texas Instruments, Startup Current Transient of the Leading Edge Triggered PFC Controllers, Application Report SLUA321, Jul. 2004, 4 pages (pp. 1-4 in pdf), Dallas, TX, USA.
Texas Instruments, Current Sense Transformer Evaluation UCC3817, Application Report SLUA308, Feb. 2004, 3 pages (pp. 1-3 in pdf), Dallas, TX, USA.
Texas Instruments, 350-W, Two-Phase Interleaved PFC Pre-regulator Design Review, Application Report SLUA369B, Feb. 2005—Revised Mar. 2007, 22 pages (pp. 1-22 in pdf), Dallas, TX, USA.
Texas Instruments, Average Current Mode Controlled Power Factor Correction Converter using TMS320LF2407A, Application Report SPRA902A, Jul. 2005, 15 pages (pp. 1-15 in pdf), Dallas, TX, USA.
Texas Instruments, Transition Mode PFC Controller, UCC28050, UCC28051, UCC38050, UCC38051, Application Note SLUS5150, Sep. 2002—Revised Jul. 2005, 28 pages (pp. 1-28 in pdf), Dallas TX, USA.
Texas Instruments, Interleaving Continuous Conduction Mode PFC Controller, UCC28070, SLUS794C, Nov. 2007—Revised Jun. 2009, 44 pages (pp. 1-44 in pdf), Dallas, TX, USA.
Texas Instruments, BiCMOS Power Factor Prerefulator Evaluation Board UCC3817, User's Guide, SLUU077C, Sep. 2000—Revised Nov. 2002, 10 pages (pp. 1-10 in pdf), Dallas, TX, USA.
On Semiconductor, Four Key Steps to Design a Continuous Conduction Mode PFC Stage Using the NCP1653, Application Note AND8184/D, Nov. 2004, 8 pages (pp. 1-8 in pdf), Phoenix, AZ, USA.
Unitrode, BiCMOS Power Factor Preregulator, Texas Instruments, UCC2817, UCC2818, UCC3817, UCC3818, SLUS3951, Feb. 2000—Revised Feb. 2006, 25 pages (pp. 1-25 in pdf), Dallas, TX, USA.
Unitrode, Optimizing Performance in UC 3854 Power Factor Correction Applications, Design Note DDN-39E, Nov. 1994, 6 pages (pp. 1-6 in pdf), Merrimack, ME, USA.
Unitrode, High Power-Factor Preregulator, UC1852, UC2852, UC3852, Feb. 5, 2007, 8 pages (pp. 1-8 in pdf), Merrimack, ME, USA.
Unitrode, UC3854A/B and UC3855A/B Provide Power Limiting with Sinusoidal Input Current for PFC Front Ends, SLUA196A, Design Note DN-66, Jun. 1995—Revised Nov. 2001, 6 pages (pp. 1-6 in pdf), Merrimack, ME, USA.
Unitrode, Programmable Output Power Factor Preregulator, UCC2819, UCC3819, SLUS482B, Apr. 2001—Revised Dec. 2004, 16 pages (pp. 1-16 in pdf), Merrimack, ME, USA.
Brkovic, Milivoje, Automatic Current Shaper with Fast Output Regulation and Soft-Switching, Telecommunications Energy Conference, INTELEC '93. 15th International, Sep. 27-30, 1993, pp. 379-386, vol. 1, California Institute Technology, Pasadena, California USA.
Dilouie, Craig, Introducing the LED Driver, Electrical Construction & Maintenance (EC&M), Sep. 1, 2004, ,pp. 28-32, Zing Communications, Inc., Calgary, Alberda, Canada.
Spiazzi, Giorgio, Simone Buso and Gaudenzio Meneghesso, Analysis of a High-Power-Factor Electronic Ballast for High Brightness Light Emitting Diode, Power Electronics Specialist Conference, Jun. 16, 2005. PESC '05, IEEE 36th, pp. 1494-1499, 2005, Dept. of Information Engineering, University of Padova, Padova, Italy.
Supertex Inc, 56W Off-line LED Driver, 120VAC with PFC, 160V, 350mA Load, Dimmer Switch Compatible, DN-H05, pp. 1-20, Jun. 17, 2008, Sunnyvale, California, USA.
Texas Instruments, High Performance Power Factor Preregulator, UC2855A/B and UC3855A/B, SLUS328B, Jun. 1998, Revised Oct. 2005, pp. 1-14, Dallas, TX, USA.
Balogh, Laszlo, et al,Power-Factor Correction with Interleaved Boost Converters in Continuous—Inductor—Current Mode, Mar. 1993, IEEE, pp. 168-174, Switzerland.
Cheng, Hung L., et al, A Novel Single-Stage High-Power-Factor Electronic Ballast with Symmetrical Topology, Power Electronics and Motion Control Conference, 2006. IPEMC 2006. CES/IEEE 5th International, Aug. 14-16, 2006, vol. 50, No. 4, Aug. 2003, pp. 759-766, Nat. Ilan Univ., Taiwan.
Fairchild Semiconductor, Theory and Application of the ML4821 Average Current Mode PFC Controllerr, Fairchild Semiconductor Application Note 42030, Rev. 1.0, Oct. 25, 2000, pp. 1-19, San Jose, California, USA.

(56) References Cited

OTHER PUBLICATIONS

Garcia, O., et al, High Efficiency PFC Converter to Meet EN610000302 and A14, Industrial Electronics, 2002. ISIE 2002. Proceedings of the 2002 IEEE International Symposium, vol. 3, pp. 975-980, Nov. 2002, Div. de Ingenieria Electronica, Univ. Politecnica de Madrid, Spain.

Infineon Technologies AG, Standalone Power Factor Correction (PFC) Controller in Continuous Conduction Mode (CCM), Infineon Power Management and Supply, CCM-PFC, ICE2PCS01, ICE2PCS01G, Version 2.1, Feb. 6, 2007, p. 1-22, Munchen, Germany.

Lu, et al, Bridgeless PFC Implementation Using One Cycle Control Technique, International Rectifier, Mar. 2005, pp. 1-6, Blacksburg, VA, USA.

Brown, et al, PFC Converter Design with IR1150 One Cycle Control IC, International Rectifier, Application Note AN-1077, pp. 1-18, Jun. 2005. El Segundo CA, USA.

International Rectifer, PFC One Cycle Control PFC IC, International Rectifier, Data Sheet No. PD60230 rev. C, IR1150(S)(PbF), IR11501(S)(PbF), Feb. 5, 2007, pp. 1-16, El Segundo, CA, USA.

International Rectifier, IRAC1150=300W Demo Board, User's Guide, Rev 3.0, International Rectifier Computing and Communications SBU—AC-DC Application Group, pp. 1-18, Aug. 2, 2005, El Segundo, CO USA.

Lai, Z., et al, A Family of Power-Factor-Correction Controllerr, Applied Power Electronics Conference and Exposition, 1997. APEC '97 Conference Proceedings 1997., Twelfth Annual, vol. 1, pp. 66-73, Feb. 23-27, 1997, Irvine, CA.

Lee, P, et al, Steady-State Analysis of an Interleaved Boost Converter with Coupled Inductors, IEEE Transactions on Industrial Electronics, vol. 47, No. 4, Aug. 2000, pp. 787-795, Hung Hom, Kowloon, Hong Kong.

Linear Technology, Single Switch PWM Controller with Auxiliary Boost Converter, Linear Technology Corporation, Data Sheet LT1950, pp. 1-20, 2003, Milpitas, CA, USA.

Linear Technology, Power Factor Controller, Linear Technology Corporation, Data Sheet LT1248, pp. 1-12, Apr. 20, 2007, Milpitas, CA, USA.

Supertex, Inc., HV9931 Unity Power Factor LED Lamp Driver, Supertex, Inc., Application Note AN-H52, 2007, pp. 1-20, Mar. 7, 2007, Sunnyvale, CA, USA.

Ben-Yaakov, et al, The Dynamics of a PWM Boost Converter with Resistive Input, IEEE Transactions on Industrial Electronics, vol. 46., No. 3, Jun. 1999, pp. 1-8, Negev, Beer-Sheva, Israel.

Erickson, Robert W., et al, Fundamentals of Power Electronics, Second Edition, Chapter 6, 2001, pp. 131-184, Jan. 2001, Boulder CO, USA.

Fairchild Semiconductor, 500W Power-Factor-Corrected (PFC) Converter Design with FAN4810, Application Note 6004, Rev. 1.0.1, Oct. 31, 2003, San Jose, CA, USA.

Fairfield Semiconductor, Power Factor Correction (PFC) Basics, Application Note 42047, Rev. 0.9.0, Aug. 19, 2004, San Jose, CA, USA.

Fairchild Semiconductor, Design of Power Factor Correction Circuit Using FAN7527B, Application Note AN4121, Rev. 1.0.1, May 30, 2002, San Jose, CA, USA.

Fairchild Semiconductor, Low Start-Up Current PFC/PWM Controller Combos FAN4800, Rev. 1.0.6, Nov. 2006, San Jose, CA, USA.

Fairchild Semiconductor, Power Factor Correction Controller FAN4810, Rev. 1.0.12, Sep. 24, 2003, San Jose, CA, USA.

Fairchild Semiconductor, ZVS Average Current PFC Controller FAN 4822, Rev. 1.0.1, Aug. 10, 2001, San Jose, CA, USA.

Fairchild Semiconductor, Ballast Control IC FAN7532, Rev. 1.0.2, Jun. 2006, San Jose, CA, USA.

Fairchild Semiconductor, Simple Ballast Controller FAN7544, Rev. 1.0.0, Sep. 21, 2004, San Jose, CA, USA.

Fairchild Semiconductor, Power Factor Correction Controller FAN7527B, Aug. 16, 2003, San Jose, CA, USA.

Fairchild Semiconductor, Ballast Control IC FAN7711, Rev. 1.0.2, Mar. 2007, San Jose, CA, USA.

Fairchild Semicondctor, Simple Ballast Controller, KA7541, Rev. 1.0.3, Sep. 27, 2001, San Jose, CA, USA.

Fairchild Semiconductor, Power Factor Controller, ML4812, Rev. 1.0.4, May 31, 2001, San Jose, CA, USA.

Fairchild Semiconductor, Power Factor Controller, ML4821, Rev. 1.0.2, Jun. 19, 2001, San Jose, CA, USA.

Freescale Semiconductor, Dimmable Light Ballast with Power Factor Correction, Designer Reference Manual, DRM067, Rev. 1, Dec. 2005, M68HC08 Microcontrollers, Chandler, AZ, USA.

Freescale Semiconductor, Design of Indirect Power Factor Correction Using 56F800/E, Freescale Semiconductor Application Note, AN1965, Rev. 1, Jul. 2005, Chandler, AZ, USA.

Freescale Semiconductor, Implementing PFC Average Current Mode Control using the MC9S12E128, Application Note AN3052, Addendum to Reference Design Manual DRM064, Rev. 0, Nov. 2005, Chandler, AZ, USA.

Hirota, et al, Analysis of Single Switch Delta-Sigma Modulated Pulse Space Modulation PFC Converter Effectively Using Switching Power Device, Power Electronics Specialists Conference, Nov. 2002. PESC 02. 2002 IEEE 33rd Annual, vol. 2, pp. 682-686, Hyogo Japan.

Madigan, et al, Integrated High-Quality Rectifier-Regulators, Industrial Electronics, IEEE Transactions, vol. 46, Issue 4, pp. 749-758, Aug. 1999, Cary, NC, USA.

Maksimovic, et al, Impact of Digital Control in Power Electronics, International Symposium on Power Semiconductor Devices and ICS, May 2004, Boulder, CO, USA.

Mammano, Bob, Current Sensing Solutions for Power Supply Designers, Texas Instruments, 2001, Dallas TX.

Miwa, et al, High Efficiency Power Factor Correction Using Interleaving Techniques, Applied Power Electronics Conference and Exposition, 1992. APEC '92. Conference Proceedings 1992., Seventh Annual, Feb. 23-27, 1992, pp. 557-568, MIT, Cambridge, MA, USA.

Noon, Jim, High Performance Power Factor Preregulator UC3855A/B, Texas Instruments Application Report, SLUA146A, May 1996—Revised Apr. 2004, Dallas TX, USA.

NXP Semiconductors, TEA1750, GreenChip III SMPS Control IC Product Data Sheet, Rev.01, Apr. 6, 2007, Eindhoven, The Netherlands.

Turchi, Joel, Power Factor Correction Stages Operating in Critical Conduction Mode, ON Semiconductor, Application Note AND8123/D, Sep. 2003—Rev. 1 , Denver, CO, USA.

On Semiconductor, GreenLLine Compact Power Factor Controller: Innovative Circuit for Cost Effective Solutions, MC33260, Semiconductor Components Industries, Sep. 2005—Rev. 9, Denver, CO, USA.

On Semiconductor, Enhanced, High Voltage and Efficient Standby Mode, Power Factor Controller, NCP1605, Feb. 2007, Rev. 1, Denver, CO, USA.

On Semiconductor, Cost Effective Power Factor Controller, NCP1606, Mar. 2007, Rev. 3, Denver, CO, USA.

On Semiconductor, Power Factor Controller for Compact and Robust, Continuous Conduction Mode Pre-Converters, NCP1654, Mar. 2007, Rev. PO, Denver, CO, USA.

Philips Semiconductors, 90W Resonant SMPS with TEA1610 SwingChip, Application Note AN99011, Sep. 14, 1999, The Netherlands.

Prodic, et al, Dead-Zone Digital Controller for Improved Dynamic Response of Power Factor Preregulators, Applied Power Electronics Conference and Exposition, 2003. APEC '03. Eighteenth Annual IEEE, Feb. 9-13, 2003, vol. 1, pp. 382-388, Boulder, CO, USA.

Prodic, et al, Digital Controller for High-Frequency Rectifiers with Power Factor Correction Suitable for On-Chip Implementation, Power Conversion Conference—Nagoya, 2007. PCC '07, Apr. 2-5, 2007, pp. 1527-1531, Toronto, Canada.

Prodic, Aleksander, Compensator Design and Stability Assessment for Fast Voltage Loops of Power Factor Correction Rectifiers, IEEE Transactions on Power Electronics, vol. 22, Issue 5, Sep. 2007, pp. 1719-1730, Toronto, Canada.

U.S. Appl. No. 13/105,142, filed May 11, 2012, Sood, et al.

Renesas, Renesas Technology Releases Industry's First Critical-Conduction-Mode Power Factor Correction Control IC Implementing Interleaved Operations, R2A20112, Dec. 18, 2006, Tokyo, Japan.

(56) References Cited

OTHER PUBLICATIONS

Renesas, PFC Control IC R2A20111 Evaluation Board, Application Note R2A20111 EVB, Feb. 2007, Rev. 1.0, Tokyo, Japan.
Renesas, Power Factor Correction Controller IC, HA16174P/FP, Rev. 1.0, Jan. 6, 2006, Tokyo, Japan.
Seidel, et al, A Practical Comparison Among High-Power-Factor Electronic Ballasts with Similar Ideas, IEEE Transactions on Industry Applications, vol. 41, No. 6, Nov./Dec. 2005, pp. 1574-1583, Santa Maria, Brazil.
Stmicroelectronics, Transition-Mode PFC Controller, Datasheet L6562, Rev. 8, Nov. 2005, Geneva, Switzerland.
Stmicroelectronics, Electronic Ballast with PFC Using L6574 and L6561, Application Note AN993, May 2004, Geneva Switzerland.
Stmicroelectronics, Advanced Transition-Mode PFC Controller L6563 and L6563A, Mar. 2007, Geneva Switzerland.
Stmicroelectronics, CFL/TL Ballast Driver Preheat and Dimming, L6574, Sep. 2003, Geneva Switzerland.
Stmicroelectronics, Power Factor Corrector, L6561, Rev. 16, Jun. 2004, Geneva, Switzerland.
Texas Instruments, Avoiding Audible Noise at Light Loads When Using Leading Edge Triggered PFC Converters, Application Report SLUA3091, Mar. 2004—Revised Sep. 2004, Dallas, TX, USA.
Texas Instruments, Startup Current Transient of the Leading Edge Triggered PFC Controllers, Application Report SLUA321, Jul. 2004, Dallas, TX, USA.
Texas Instruments, Current Sense Transformer Evaluation UCC3817, Application Report SLUA308, Feb. 2004, Dallas, TX, USA.
Texas Instruments, 350-W, Two-Phase Interleaved PFC Pre-regulator Design Review, Application Report SLUA369B, Feb. 2005—Revised Mar. 2007, Dallas, TX, USA.
Texas Instruments, Average Current Mode Controlled Power Factor Correction Converter using TMS320LF2407A, Application Report SPRA902A, Jul. 2005, Dallas, TX, USA.
Texas Instruments, Transition Mode PFC Controller, UCC28050, UCC28051, UCC38050, UCC38051, Application Note SLUS5150, Sep. 2002—Revised Jul. 2005, Dallas TX, USA.
Texas Instruments, Interleaving Continuous Conduction Mode PFC Controller, UCC28070, SLUS794C, Nov. 2007—Revised Jun. 2009, Dallas, TX, USA.
Texas Instruments, BiCMOS Power Factor Prerefulator Evaluation Board UCC3817, User's Guide, SLUU077C, Sep. 2000—Revised Nov. 2002, Dallas, TX, USA.
On Semiconductor, Four Key Steps to Design a Continuous Conduction Mode PFC Stage Using the NCP1653, Application Note AND8184/D, Nov. 2004, Phoenix, AZ, USA.
Unitrode, BiCMOS Power Factor Preregulator, Texas Instruments, UCC2817, UCC2818, UCC3817, UCC3818, SLUS3951, Feb. 2000—Revised Feb. 2006, Dallas, TX, USA.
Unitrode, Optimizing Performance in UC 3854 Power Factor Correction Applications, Design Note DDN-39E, Nov. 1994, Merrimack, ME, USA.
Unitrode, High Power-Factor Preregulator, UC1852, UC2852, UC3852, Feb. 5, 2007, Merrimack, ME, USA.
Unitrode, UC3854A/B and UC3855A/B Provide Power Limiting with Sinusoidal Input Current for PFC Front Ends, SLUA196A, Design Note DN-66, Jun. 1995—Revised Nov. 2001, Merrimack, ME, USA.
Unitrode, Programmable Output Power Factor Preregulator, UCC2819, UCC3819, SLUS482B, Apr. 2001—Revised Dec. 2004, Merrimack, ME, USA.
Yao, et al, Soft Switching Circuit for Interleaved Boost Converters, IEEE Transactions on Power Electronics, vol. 22, No. 1, Jan. 2007, pp. 80-86, Zhejiang Univ., Hangzhou.
Zhang, et al, A New Duty Cycle Control Strategy for Power Factor Correction and FPGA Implementation, IEEE Transactions on Power Electronics, vol. 21, No. 6, Nov. 2006, pp. 1745-1753, Ontario, Canada.
Zhou, et al, Novel Sampling Algorithm for DSP Controlled 2kW PFC Converter, IEEE Transactions on Power Electronics, vol. 16, No. 2, Mar. 2001, pp. 217-222, Zhejiang Univ., Hangzhou.

\* cited by examiner

INTEGRATED CIRCUIT SWITCHING POWER SUPPLY CONTROLLER WITH SELECTABLE BUCK MODE OPERATION

The present U.S. Patent Application claims priority under 35 U.S.C. §119(e) to U.S. Provisional Patent Application Ser. No. 61/369,202 filed on Jul. 30, 2010.

BACKGROUND OF THE INVENTION

1. Field of the Invention

The present invention relates generally to switching power supply circuits, and in particular to an integrated circuit controller for controlling a switching power supply circuit and having selectable buck mode operation.

2. Background of the Invention

Lighting control and power supply integrated circuits (ICs) are in common use in both electronic systems and in replaceable consumer lighting devices, e.g., light-emitting-diode (LED) and compact fluorescent lamp (CFL) replacements for traditional incandescent light bulbs. In order to provide a constant or variable level of intensity, the current supplied to the lighting devices must typically be controlled. Additionally, other applications require controlled-current power supplies.

Depending on conditions such as input voltage range, cost factors, and isolation requirements, different topologies are desirable for implementing switching power supplies in each particular set of conditions. However, when the control of the switching power supply is provided from an integrated circuit controller (IC), producing an IC switching power supply controller for each different topology increases the cost, inventories and management requirements for both the IC and the end product.

Therefore, it would be desirable to provide an IC controller for a controlled-current power supply that can support multiple power supply topologies.

SUMMARY OF THE INVENTION

The invention is embodied in an integrated circuit (IC) and its method of operation. The IC is a controlled-current switching power supply controller.

The IC has multiple selectable operating modes, including a buck converter operating mode and another operating mode, which may be a flyback converter operating mode. The IC controller controls the cycle rate of the converter by controlling one or more switching devices that may be internal to, or external to the IC, in order to maintain a fixed or variable output current level.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses power supply controller integrated circuits (ICs) and their methods of operation. In particular embodiments, power supplies implemented using the controller ICs provide constant or variable output current levels to lighting devices such as light-emitting diodes (LEDs). The brightness of the LEDs may be controlled by changing the output current level according to a dimming value. The ICs have a selectable mode of operation, including a buck converter mode and one other mode. The one other mode may be a flyback converter operating mode or a mode supporting another topology. The ICs thereby support multiple switching power supply topologies.

Figure 1:
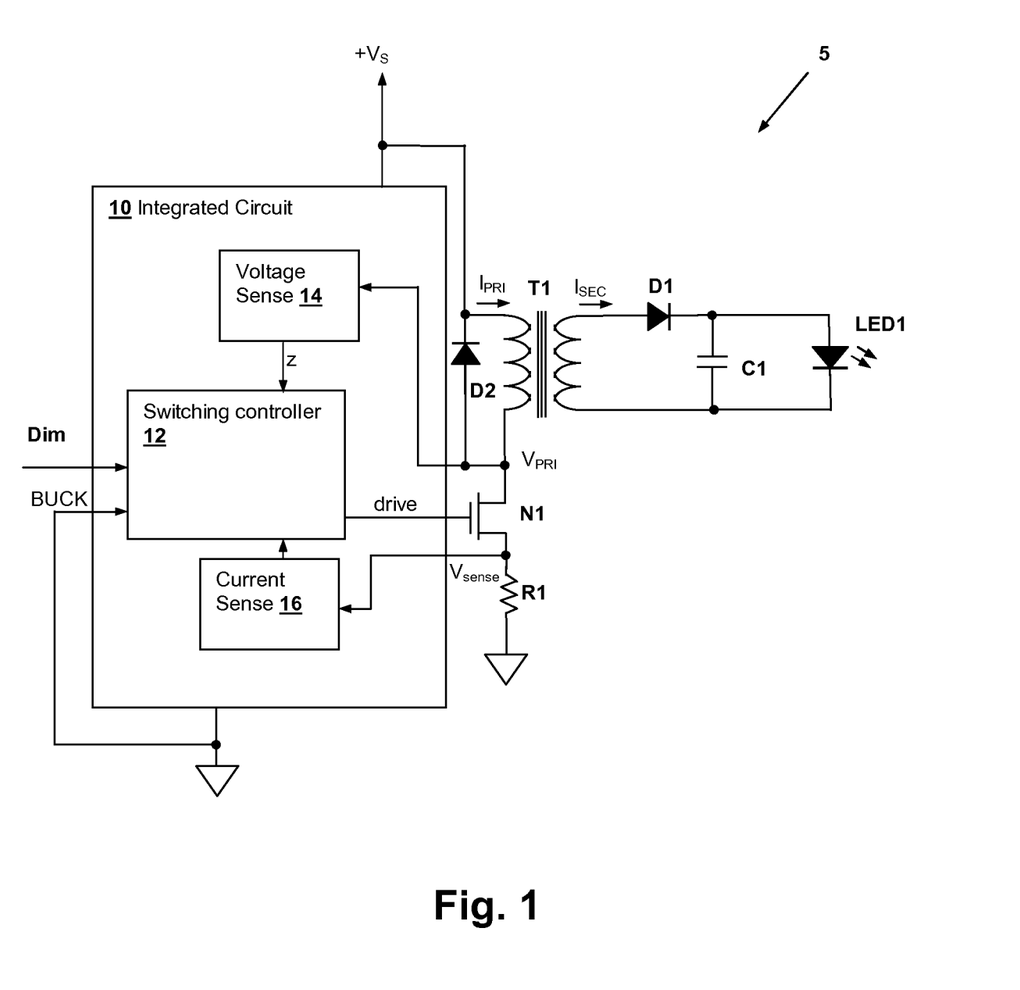
FIG. 1 is a block diagram depicting a flyback converter power supply circuit including a switching power supply controller IC 10 in accordance with an embodiment of the present invention.

Referring now to FIG. 1, a flyback switching power supply circuit 5 in accordance with an embodiment of the invention is shown. A transformer T1, provides a magnetic storage element through which energy is transferred to an LED LED1 through diode D1 and to charge capacitor C1, which provides filtering of the ripple voltage produced by the switching action of the power supply circuit 5. Transformer T1 further provides isolation between a primary side circuit coupled to a rectified line voltage source $+V_S$ and LED LED1, which may be a string of series connected LEDs. While the exemplary lighting devices are LEDs in the Figure, lighting device LED1 can alternatively be another type of lighting device, in accordance with other embodiments of the invention. Further, the techniques of the present invention may be used in other applications requiring controlled-current power supplies, such as motor control applications.

An integrated circuit (IC) 10 provides a primary-side controller that operates a switching transistor N1, which is illustrated as external to IC 10, but that alternatively may be included within IC 10. A switching controller 12 provides a pulse frequency modulated (PFM) gate control signal drive to vary the cycle rate of the switching power supply circuit. Switching controller also receives an indication of the selected operating mode of integrated circuit 10, which in the illustration is a logical input signal provided from a terminal of integrated circuit 10, that when in a logic low condition (ground) selects a flyback operating mode, as shown. The gate of switching transistor N1 is controlled by the PFM switching signal to control the amount of energy applied to the primary winding of transformer T1, according to dimming values DIM, which may be provided by a source internal or external to integrated circuit 10. The current supplied to LED LED1 is thereby controlled by switching controller 12, according to feedback values provided by a current sense circuit 16, which senses the magnitude of primary winding current $I_{PRI}$ of transformer T1 while switching transistor N1 is conducting, and from a voltage sensing circuit 14 that senses a voltage across the primary winding of transformer T1, so that the end of the flyback interval (when switching transistor N1 is not conducting and secondary winding current $I_{SEC}$ is non-zero) can be determined.

In the illustrated example, primary winding current $I_{PRI}$ is measured by including a sense resistor R1 connected between the source of transistor N1 and ground. Current sense circuit 16 determines an indication of the peak current $I_{PEAK}$ through the primary winding of transformer T1, by detecting the peak value of a voltage $V_{sense}$ generated across sense resistor R1 at each cycle. The value of peak current $I_{PEAK}$ is retained (sampled) to use in controlling the next switching cycle(s) of switching controller 12.

Also in the illustrated example, the duration of the flyback interval, during which secondary winding current $I_{SEC}$ is non-zero and capacitor C1 is being charged, is determined by voltage sensing circuit 14, which determines when the voltage across the primary winding of transformer T1 is negative and non-zero, i.e., the duration of the period $t_{fly}$ extending from the turn-off time of transistor N1 until diode D1 ceases conduction. Voltage sensing circuit 14 generates logic signal z, which is active only during flyback interval $t_{fly}$. Both the sampled peak primary winding current $I_{peak}$ and the duration of the flyback interval $t_{fly}$, will be used in determining the cycle rate of the next switching cycle(s) of gate control signal drive.

Figure 2:
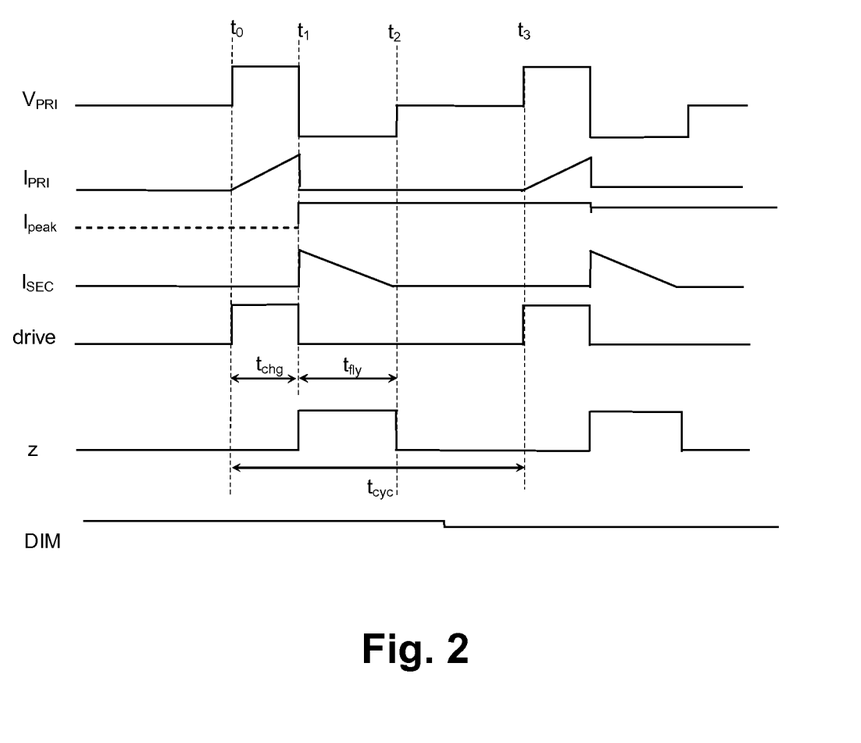
FIG. 2 is a timing diagram illustrating signals within the circuit of FIG. 1.

Referring additionally now to FIG. 2, exemplary signals within the circuit of FIG. 1 are illustrated in a timing diagram. A first charging interval $t_{chg}$ between times $t_0$ and $t_1$ stores energy in transformer T1 determined by the peak current $I_{peak}$ of primary winding current $I_{PRI}$ at time $t_1$. The rising value of primary winding current $I_{PRI}$ is caused by activation of switching transistor N1 according to gate drive signal drive. During flyback interval $t_{fly}$ between times $t_1$ and $t_2$ the flyback secondary current $I_{SEC}$ from the secondary winding of transformer T1 passes through diode D1 to charge capacitor C1, to power LED LED1. The switching cycle repeats after the cycle time $t_{cyc}$ has elapsed, which determines the cycle rate of the switching power supply circuit. In order to maintain a constant current $I_{OUT}$ through LED LED1, or a particular current level $I_{OUT}$ for a particular dimming value DIM, where the current supplied is variable according to dimming value DIM, the cycle time $t_{cyc}$ to generate particular current level $I_{OUT}$ in the flyback converter mode is given by:

$$t_{cyc}=0.5*N*I_{peak}/I_{OUT}*t_{fly},$$

where N is the turns ratio (secondary windings/primary windings) of transformer T1. In the buck operating mode, the cycle time formula to generate particular current level $I_{OUT}$ is different, as will be illustrated below. For the control algorithm, the cycle time can be controlled according to:

$$t_{cyc}=K*I_{peak}*t_{fly},$$

since only $I_{peak}$ and $t_{fly}$ should vary in the equation above. In order to provide proper operation, integrated circuit 10 must be operated in the mode that corresponds to the topology of the switching power supply circuit in which integrated circuit 10 is installed, and the component values provided in the circuit must be determined for proper operation, e.g., the core of transformer T1 (or inductor L1 used in the non-isolated buck converter topology illustrated below) must be sized to avoid saturation during charging interval $t_{chg}$, along with other usual considerations in switching power supply design and component selection.

Figure 3:
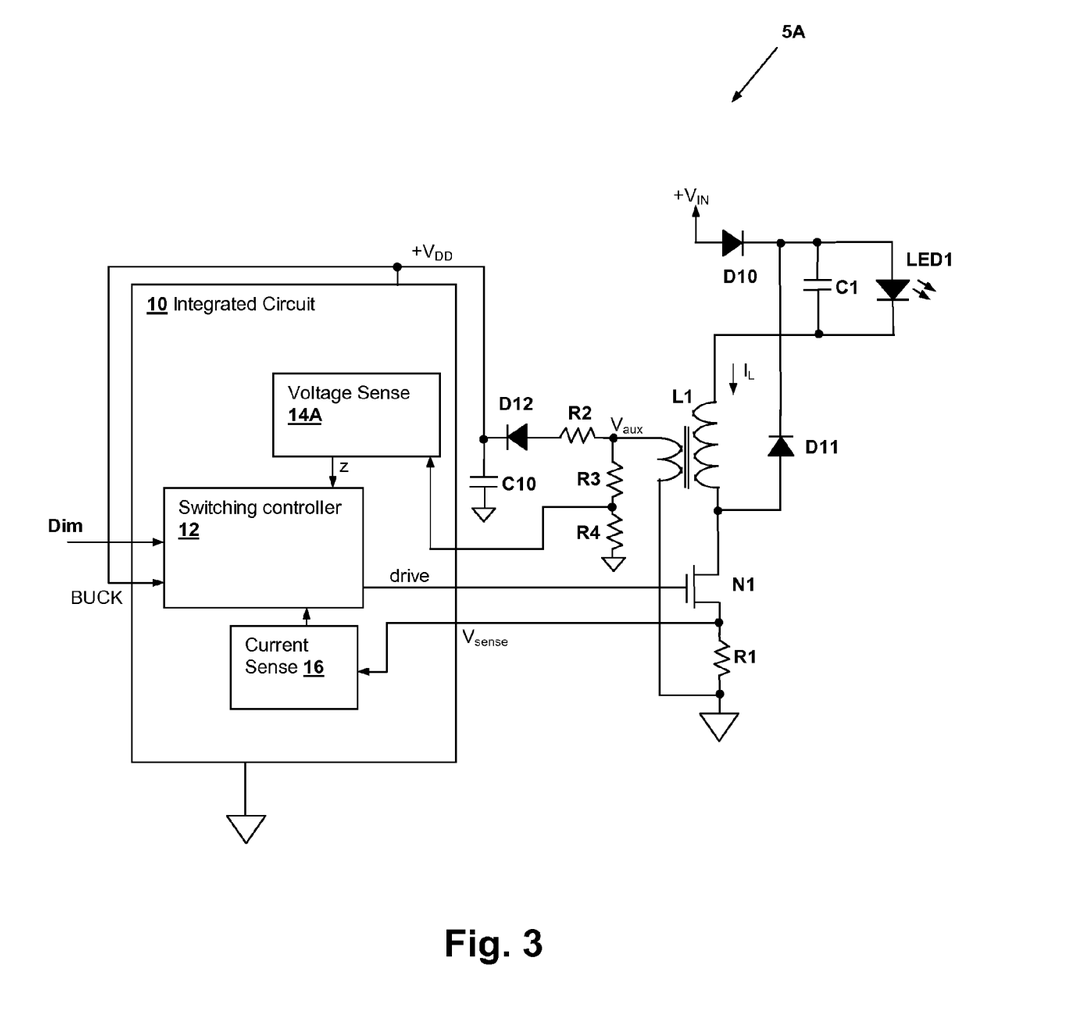
FIG. 3 is a block diagram depicting a buck converter power supply circuit including switching power supply controller IC 10 in accordance with another embodiment of the present invention.

Referring now to FIG. 3, a buck switching power supply circuit 5A in accordance with another embodiment of the invention is shown. Buck switching power supply circuit 5A is similar to flyback switching power supply circuit 5 of FIG. 1, so only differences between them will be described below. The buck operating mode of integrated circuit 10 is selected by strapping input terminal BUCK to power supply voltage $+V_{DD}$. An inductor L1, provides the magnetic storage element through which energy is transferred to LED LED1. In buck switching power supply circuit 5A, current is supplied through LED LED1 when transistor N1 is conducting by conduction of diode D10, and also during the flyback interval by conduction of diode D11. Therefore, the control equation for providing a constant output current $I_{OUT}$ differs from that of flyback switching power supply circuit 5 of FIG. 1, and for the buck operating mode selected in buck switching power supply circuit 5A is given by:

$$t_{cyc}=0.5*I_{peak}/I_{OUT}*(t_{chg}+t_{fly}).$$

For the buck control algorithm, the cycle time can be controlled according to:

$$t_{cyc}=K*I_{peak}*(t_{chg}+t_{fly}).$$

Another difference in buck switching power supply circuit 5A from flyback switching power supply circuit 5 of FIG. 1, is in the detection of the flyback interval duration $t_{fly}$. An auxiliary winding is provided on inductor L1 and is used to provide a power supply voltage $+V_{DD}$ for powering integrated circuit 10 through rectifier diode D12, filter resistor R2 and filter capacitor C10. A voltage divider formed by resistors R3 and R4 provides an input voltage signal to voltage sense circuit 14A, which is a scaled version of auxiliary winding voltage $V_{aux}$. Just as in flyback switching power supply circuit 5 of FIG. 1, voltage sense circuit 14A, which may be identical to voltage sense circuit 14 of FIG. 1 and may receive input from the same terminal as in the flyback converter configuration, detection of a negative voltage pulse duration across the auxiliary winding of inductor L1 provides a measure of the flyback interval duration $t_{fly}$. The auxiliary winding circuit shown in FIG. 3 can be used as an alternative to detection of primary winding voltage $V_{PRI}$ in the circuit of FIG. 1, in accordance with another embodiment of the present invention, by providing an auxiliary winding on transformer T1, which may also be used to provide a power supply voltage $+V_{DD}$ for powering integrated circuit 10, as in the circuit of FIG. 3.

Figure 4:
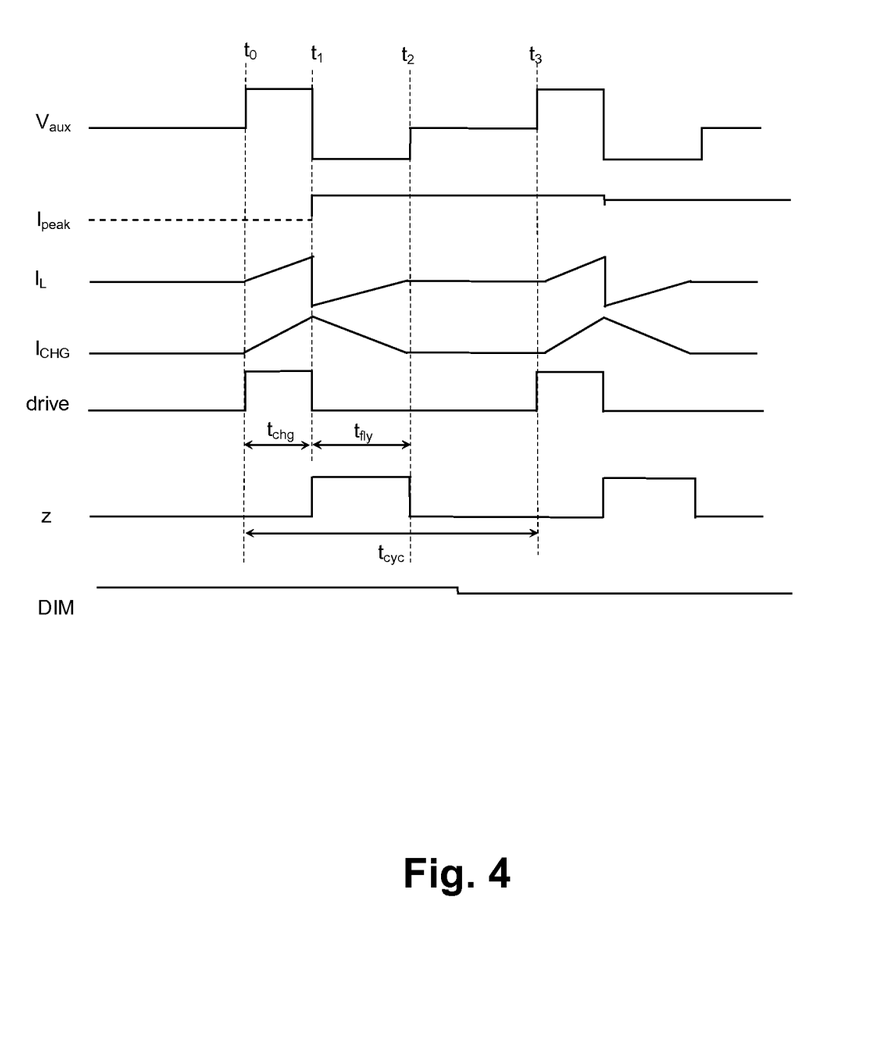
FIG. 4 is a timing diagram illustrating signals within the circuit of FIG. 3.

Referring additionally now to FIG. 4, exemplary signals within the circuit of FIG. 3 are illustrated in a timing diagram. The timing diagram of FIG. 4 is similar to that of FIG. 2, so only differences between them will be described below. Rather than separate primary and secondary current waveforms, inductor current $I_L$ has both positive and negative portions, the positive portion corresponding to the time when gate control signal drive is active, and the negative portion corresponding to flyback interval $t_{fly}$. Charging interval $t_{chg}$ between times $t_0$ and $t_1$ stores energy in inductor L1 determined by the peak current $I_{peak}$ of inductor current $I_L$ at time $t_1$. The current through inductor L1 is also the same as charging current $I_{CHG}$ that charges capacitor C1 during charging interval $t_{chg}$. Charging current $I_{CHG}$ also charges capacitor C1 during flyback interval $t_{fly}$ due to conduction of diode D11, leading to the triangular shape of the waveform of charging current $I_{CHG}$.

Figure 5:
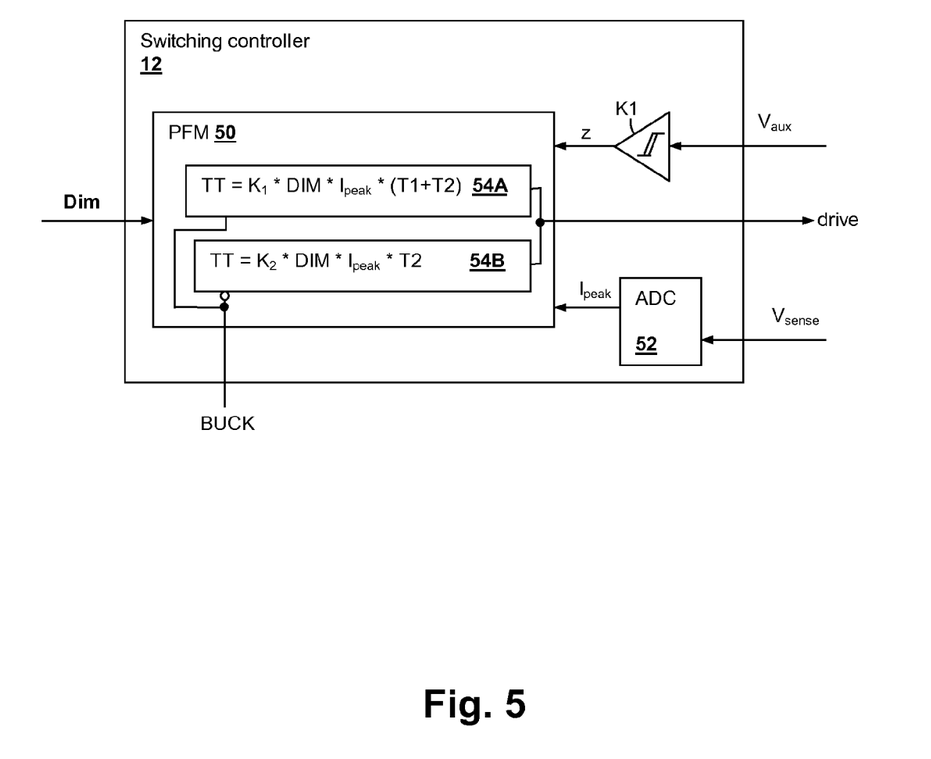
FIG. 5 is a block diagram depicting details of switching power supply controller IC 10 in accordance with an embodiment of the present invention.

Referring now to FIG. 5, details of switching controller 12 within integrated circuit 10 are shown in accordance with an embodiment of the present invention. The depicted circuit is exemplary, and provides only one particular example of a circuit that may be used to implement switching controller 12. In the depicted example, current sensing circuit 16 is subsumed in switching controller 12 and is provided by an analog-to-digital converter (ADC) 52 and logic or a program within pulse frequency modulator (PFM) 50 that detects the peak current level $I_{PEAK}$. Voltage sensing circuit 14 is also subsumed in switching controller 12, the function of which is provided by a comparator K1 that generates logic signal z, indicative of the polarity of the auxiliary (or primary) winding voltage. PFM 50 then determines the duration of flyback interval $t_{fly}$. Depending on the state of the operating mode selection signal BUCK, one of buck converter algorithm 54A or flyback converter algorithm 54B is selected to generate gate control signal drive.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. An integrated circuit for controlling a power supply circuit that generates an output current, the integrated circuit comprising:
   an input for receiving a signal from a winding of a magnetic storage element of the power supply circuit;
   a detection circuit coupled to the input for processing the signal from the winding of the magnetic storage element to detect a duration of a flyback interval during which the magnetic storage element of the power supply circuit is supplying current to an output of the power supply circuit and for determining an indication of a peak current in the magnetic storage element at the end of a charging interval during which the magnetic storage element is storing energy supplied from the power supply circuit; and
   a control circuit for generating a switching control signal to control a cycle rate of the power supply circuit according to a selectable operating mode of the integrated circuit that is selectable between a buck operating mode and another operating mode, wherein in the buck operating mode the cycle rate is controlled according to a first value computed according to a first algorithm from the indication of the peak current and the detected duration of the flyback interval to maintain the output current at a constant value, and wherein in the another operating mode the cycle rate is controlled according to a second value computed according to a second algorithm from the peak current and the detected duration of the flyback interval to maintain the output current at the constant value, wherein the second algorithm differs from the first algorithm.

2. The integrated circuit of claim 1, wherein in the buck operating mode, the control circuit controls the cycle rate of the power supply circuit to hold constant a product of the indication of the peak current with a sum of the duration of the flyback interval and a duration of the charging interval.

3. The integrated circuit of claim 2, wherein the control circuit determines a cycle time of the switching control signal according to the formula:

$t_{cyc}=K*I_{peak}*(t_{chg}+t_{fly})$, where K is a constant, $t_{cyc}$ is the cycle time, $I_{peak}$ is the indication of the peak current, $t_{chg}$ is the duration of the charging interval and $t_{fly}$ is the duration of the flyback interval.

4. The integrated circuit of claim 1, wherein the another operating mode is a flyback operating mode in which the control circuit controls the cycle rate of the power supply circuit to hold constant a product of the indication of the peak current with a duration of the flyback interval.

5. The integrated circuit of claim 4, wherein the control circuit determines a cycle time of the switching control signal according to the formula:

$t_{cyc}=K*I_{peak}*t_{fly}$, where K is a constant, $t_{cyc}$ is the cycle time, $I_{peak}$ is the indication of the peak current and $t_{fly}$ is the duration of the flyback interval.

6. The integrated circuit of claim 1, wherein the control circuit receives a dimming value from a dimming input, and wherein the control circuit scales the cycle rate by the dimming value to control an output current of the power supply circuit according to the dimming value.

7. The integrated circuit of claim 1, further comprising an input terminal for coupling to a winding of the magnetic storage element and wherein the detection circuit is coupled to the input terminal and detects a change in voltage across the winding that indicates an end of the flyback interval.

8. The integrated circuit of claim 1, wherein the power supply comprises a resistor coupled in series with a switching circuit and a winding of the magnetic storage element, and wherein the integrated circuit further comprises a current sensing circuit coupled to an input terminal of the integrated circuit for coupling to the resistor and sensing a voltage across the resistor to determine the peak current.

9. The integrated circuit of claim 1, further comprising a switching transistor having a gate coupled to the switching control signal, and wherein the integrated circuit further comprises a terminal for coupling a winding of the magnetic storage element.

10. The integrated circuit of claim 9, wherein the detection circuit is coupled to the terminal and detects a change in voltage across the winding that indicates an end of the flyback interval.

11. The integrated circuit of claim 9, further comprising a resistor coupled in series with the drain-source connections of the transistor and the terminal, and further comprising a current sensing circuit having an input coupled to the resistor and that senses a voltage across the resistor to determine the peak current.

12. A method of operating an integrated circuit controller capable of controlling a power supply circuit having either a buck topology or alternatively another topology to generate a constant output current, the method comprising:
   receiving an indication of whether the integrated circuit controller is installed in a buck converter circuit or alternatively another converter circuit having another topology;
   selecting a buck operating mode if the indication indicates that the integrated circuit controller is installed in a buck converter circuit;
   selecting another operating mode if the indication indicates that the integrated circuit controller is installed in the another converter circuit;
   detecting a duration of a flyback interval of the power supply;
   determining an indication of a peak current supplied to a magnetic storage element of the power supply during a charging interval of the power supply;
   responsive to selecting the buck operating mode, controlling a cycle rate of the buck converter circuit to maintain the output current at a constant value according to a first value computed by first control algorithm from the indication of peak current; and
   responsive to selecting the another operating mode, controlling the cycle rate of the another converter circuit to maintain the output current at the constant value according to a second control value computed by a second control algorithm from the peak current and that differs from the first control algorithm.

13. The method of claim 12, wherein responsive to selecting the buck operating mode, the controlling controls the cycle rate of the power supply circuit to hold constant a product of the indication of the peak current with a sum of the duration of the flyback interval and a duration of the charging interval.

14. The method of claim 13, wherein the responsive to selecting the buck operating mode, the controlling determines a cycle time of the power supply circuit according to the formula:

$$t_{cyc}=K*I_{peak}*(t_{chg}+t_{fly}),$$

where K is a constant, $t_{cyc}$ is the cycle time, $I_{peak}$ is the indication of the peak current, $t_{chg}$ is the duration of the charging interval and $t_{fly}$ is the duration of the flyback interval.

15. The method of claim 12, wherein the another operating mode is a flyback operating mode in which the controlling controls the cycle rate of the power supply circuit to hold constant a product of the indication of the peak current with a duration of the flyback interval.

16. The method of claim 15, wherein responsive to selecting the flyback operating mode, the controlling determines a cycle time of the switching control signal according to the formula:

$$t_{cyc}=K*I_{peak}*t_{fly},$$

where K is a constant, $t_{cyc}$ is the cycle time, $I_{peak}$ is the indication of the peak current and $t_{fly}$ is the duration of the flyback interval.

17. The method of claim 12, further comprising receiving a dimming value from a dimming input, and wherein the controlling scales the cycle rate by the dimming value to control an output current of the power supply circuit according to the dimming value.

18. An integrated circuit for controlling a power supply circuit, the integrated circuit comprising a control circuit for controlling a cycle rate of the power supply circuit according to a selectable operating mode of the integrated circuit that is selectable between a buck operating mode and another operating mode to generate an output current of the power supply circuit, wherein in the buck operating mode the cycle rate is determined to maintain the output current at the constant value according to a first value computed by a first algorithm from a peak current through a winding of a magnetic storage element of the power supply circuit, and wherein in the another operating mode the cycle rate is determined to maintain the output current at the constant value according to a second value computed by a second algorithm differing from the first algorithm from the peak current through the winding of the magnetic storage element during the switching cycle.

19. A method of controlling a power supply circuit from an integrated circuit controller, the method comprising:
selecting an operating mode of the integrated circuit controller, wherein the operating mode is selectable between a buck operating mode and another operating mode;
controlling a cycle rate of the power supply circuit according to the selected operating mode to generate an output current of the power supply circuit, wherein in the buck operating mode the cycle rate is determined to maintain the output current at a constant value according to a first value computed by a first algorithm from a peak current through a winding of a magnetic storage element of the power supply circuit during a switching cycle of the power supply circuit, and wherein in the another operating mode the cycle rate is determined in order to maintain the output current at the constant value according to a second value computed by a second algorithm differing from the first algorithm from the peak current through the winding of the magnetic storage element during the switching cycle.

* * * * *